United States Patent
Haynes et al.

(10) Patent No.: US 7,458,395 B2
(45) Date of Patent: Dec. 2, 2008

(54) LOW LEAK POPPET SOLENOID

(75) Inventors: William D. Haynes, Clarkston, MI (US); Michael E. Jones, Royal Oak, MI (US)

(73) Assignee: BorgWarner Inc., Auburn Hills, MI (US)

(*) Notice: Subject to any disclaimer, the term of this patent is extended or adjusted under 35 U.S.C. 154(b) by 32 days.

(21) Appl. No.: 10/862,778

(22) Filed: Jun. 7, 2004

(65) Prior Publication Data

US 2005/0269538 A1 Dec. 8, 2005

(51) Int. Cl.
*F16K 31/04* (2006.01)

(52) U.S. Cl. .............. 137/625.65; 137/627.5; 251/129.08; 251/344

(58) Field of Classification Search ........... 251/129.21, 251/129.15, 344, 129.08; 137/625.65, 627.5
See application file for complete search history.

(56) References Cited

U.S. PATENT DOCUMENTS

| | | | |
|---|---|---|---|
| 2,601,989 A * | 7/1952 | Modes ................. | 137/625.4 |
| 2,886,063 A * | 5/1959 | Ray ..................... | 251/129.21 |
| 3,043,336 A * | 7/1962 | Parent et al. .......... | 137/625.5 |
| 4,102,526 A * | 7/1978 | Hargraves ............. | 251/129.21 |
| 4,230,156 A * | 10/1980 | Frantz .................. | 137/625.5 |
| 4,582,294 A * | 4/1986 | Fargo .................. | 251/129.21 |
| 4,598,736 A * | 7/1986 | Chorkey ............... | 137/625.65 |
| 4,790,513 A * | 12/1988 | Davis et al. ........... | 251/129.21 |
| 4,821,774 A * | 4/1989 | Chorkey ............... | 137/625.65 |
| 4,836,248 A * | 6/1989 | Stegmeier ............. | 137/625.65 |
| 4,944,331 A * | 7/1990 | Tackett ................ | 137/625.65 |
| 5,050,840 A | 9/1991 | Kondo et al. | |
| 5,208,570 A | 5/1993 | Nippert | |
| 5,845,667 A | 12/1998 | Najmolhoda et al. | |
| 5,918,635 A * | 7/1999 | Wang et al. ............ | 137/625.65 |
| 5,921,526 A | 7/1999 | Najmolhoda et al. | |
| 5,984,259 A | 11/1999 | Najmolhoda et al. | |
| 5,992,461 A * | 11/1999 | Gilmore et al. ........ | 137/625.65 |
| 5,996,628 A | 12/1999 | Najmolhoda et al. | |
| 6,179,268 B1 | 1/2001 | Seid et al. | |
| 6,220,275 B1 * | 4/2001 | Nishinosono et al. .. | 251/129.08 |
| 6,223,761 B1 | 5/2001 | Najmolhoda et al. | |
| 6,321,767 B1 | 11/2001 | Seid et al. | |
| 6,386,220 B1 * | 5/2002 | Koenings .............. | 251/129.08 |
| 6,405,755 B1 * | 6/2002 | Doehla et al. ......... | 251/129.15 |
| 6,418,967 B1 | 7/2002 | Frei et al. | |
| 6,435,472 B1 | 8/2002 | Najmolhoda et al. | |
| 6,619,615 B1 | 9/2003 | Mayr et al. | |
| 2002/0020442 A1 | 2/2002 | Najmolhoda et al. | |
| 2004/0025948 A1 | 2/2004 | Herbert et al. | |

* cited by examiner

*Primary Examiner*—John Bastianelli
(74) *Attorney, Agent, or Firm*—Warn Partners, P.C.

(57) ABSTRACT

A dual poppet low leak variable bleed solenoid valve, including a solenoid portion with an adjustable end cap disposed through the solenoid. Exhaust ports are disposed about the end cap. A hydraulic portion has a valve housing that is connectable to the solenoid portion. The hydraulic portion has a control volume formed within, and a supply port is connected through the valve housing. A valve shaft is slidably disposed through the solenoid portion and extends longitudinally into the hydraulic portion. A first end of the valve shaft terminates in the solenoid portion forming a primary valve, and a second end of the valve shaft terminates in the hydraulic portion forming a secondary valve. The valve shaft further has a hollow channel disposed through the valve shaft to allow the passage of a fluid medium between the first end and second end of the valve shaft.

4 Claims, 6 Drawing Sheets

LOW LEAK POPPET SOLENOID

FIELD OF THE INVENTION

The present invention relates to a solenoid operated bleed-style hydraulic control valve that minimizes leakage through the exhaust port when the solenoid is at minimum and maximum pressure.

BACKGROUND OF THE INVENTION

Prior art solenoid valves are often used to control the flow of hydraulic fluid in automotive vehicle transmission systems. A traditional variable bleed solenoid valve regulates pressure by reducing pressure in a control volume through a variable leak path (exhaust) to a pressure sump. The amount of leakage is inversely proportional to the pressure in the control portion of the valve. This leakage is controlled by a variable orifice, which typically takes the form of a sealing member (flat, conical, ball, or otherwise) that is moved in relation to a fixed annular sealing surface that surrounds a fixed orifice. When the sealing member is in contact with the sealing surface, the leakage approaches zero, and the pressure in the control volume is at its peak value. When the sealing member is moved away from the sealing surface, the leakage increases, and the pressure in the control volume decreases at a rate that is a function of the swept area of the shortest distance between sealing member and seat. The leakage can be significant when multiplied by the number of solenoid devices located within the transmission. Minimizing the leakage of each of the individual solenoid components is desirable in order to minimize the capacity requirement of the hydraulic pump that generates the system pressure and to improve the efficiency of the transmission. A low leak variable bleed solenoid by design minimizes this leakage. Minimal leakage to sump is achieved by integrating a supply shut off (secondary) valve in series with the exhaust bleed (primary) valve. These two valves are actuated simultaneously. When the exhaust bleed (primary) valve is fully open to achieve minimum control volume pressure, the supply shut off (secondary) valve is fully closed to prevent fluid leakage to sump through the control volume. As the exhaust bleed (primary) valve is closed to increase pressure in the control volume, the supply shut off (secondary) valve is opened to allow fluid to enter into the control volume. At maximum pressure in the control volume, the exhaust bleed (primary) valve is fully closed and the supply shut off (secondary) valve is fully open.

A disadvantage of known low leak variable bleed solenoid valves is that the addition of a supply shut off valve in close proximity to the exhaust bleed valve complicates the construction of the solenoid valve. Additional components that re-direct flow often have complex geometries that are difficult and expensive to manufacture. Another disadvantage is that many of the known low leak variable bleed solenoid valves are more sensitive to fluctuations in supply pressure and temperature as they have hydraulic areas acted upon by supply pressure that are not balanced. The invention described herein differs from the prior art by utilizing simpler valve and flow geometry, which also has the advantage of minimizing supply pressure feedback area.

SUMMARY OF THE INVENTION

The present invention is directed to a new and improved low leak poppet solenoid valve for use in an automotive transmission system. The valve includes a solenoid portion (e.g. magnet portion) having a housing encasing a bobbin with a coil wound thereon. An adjustable end cap is disposed through the housing and has exhaust port(s) disposed about the end cap. A hydraulic portion has a valve housing that is connectable to the solenoid portion. The hydraulic portion has a control volume formed within, and a supply port is connected through the valve housing. A valve shaft assembly comprised of the valve shaft and an annular armature attached about it are slidably disposed through the solenoid portion so the bobbin is annularly positioned about the armature. The hydraulic portion extends through the solenoid portion by way of a the valve shaft to complete the hydraulic portion. The valve shaft has a first end that terminates in the adjacent solenoid portion and has a poppet formed about the first end. A second end of the valve shaft is positioned adjacent the hydraulic portion and has a second poppet formed about the second end. The valve shaft further has a hollow channel disposed through the valve shaft to allow the passage of a fluid medium between the first end and second end of the valve shaft.

A primary valve seat is formed as part of the end cap and is contained within the solenoid portion. The primary valve is the main controlling valve during most of the pressure range. The primary valve seat is configured to be positioned adjacent the primary poppet on the valve shaft. A secondary valve seat is contained within the hydraulic portion and is positioned adjacent the secondary poppet of the valve shaft. The secondary valve seat is positioned between the control volume and the supply port of the hydraulic portion. Furthermore, the secondary valve seat has an aperture extending therethrough to allow interaction between the supply port and control volume. The secondary poppet provides control of the secondary control valve in the low pressure range.

A pole piece is annularly disposed in the solenoid portion adjacent the bobbin. The pole piece has a reduced diameter inner flange. An armature is attached to the valve shaft and is configured to align with and slidably circumscribe the reduced inner diameter flange of the pole piece. The armature is circumscribed by the bobbin and coil so that the valve shaft may slide longitudinally in response to the energization of the solenoid portion. In one embodiment a spring element is configured about the valve shaft and extends between the armature and the upper bearing so that when the solenoid is de-energized the spring element will cause the valve shaft to slide in a direction that will cause the secondary poppet to contact the secondary valve seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
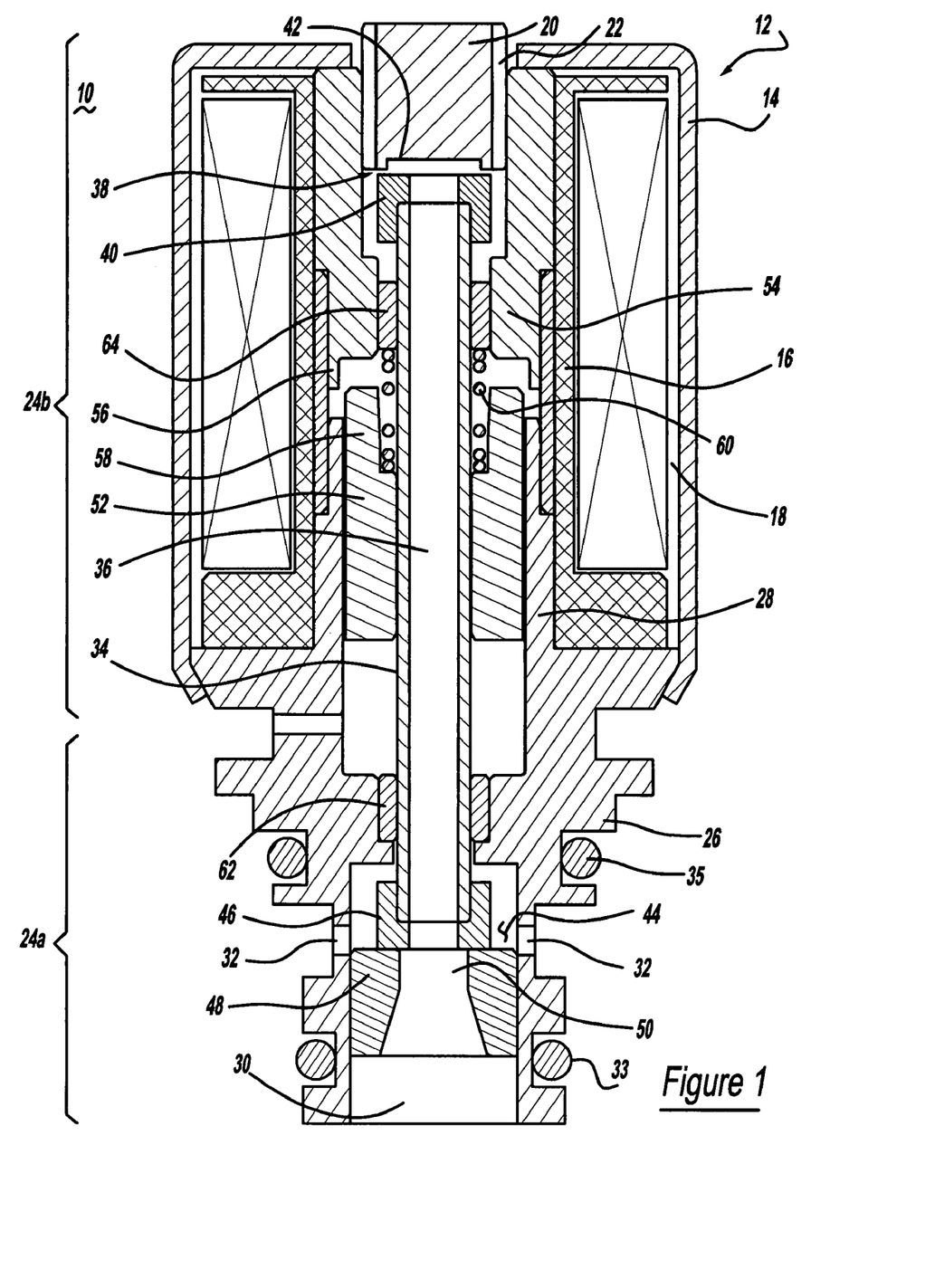
FIG. 1 depicts a cross-sectional plan view of the dual poppet low leak valve configuration.

FIG. 1 depicts a longitudinal cross-sectional plan view of a dual-poppet low leak variable bleed solenoid valve 10. The valve 10 has a solenoid portion 24b which includes a housing 14 that encases a bobbin 16 having a coil 18 wound upon the bobbin 16. When the coil 18 is energized there is a magnetic field generated in the solenoid portion 12. The solenoid portion 12 also has an end cap 20 that has exhaust ports 22 disposed about the end cap 20.

The valve 10 also has a hydraulic portion 24a that has a valve housing 26 that is connectable to the solenoid portion 24b. More specifically, a flux tube 28 portion of the valve housing 26 slides into the solenoid portion 24b adjacent the bobbin 16. The hydraulic portion 24a also includes a control volume 30 that is located at an end of the valve housing 26 opposite the solenoid portion 24b. A supply port 32 is connected through the valve housing 26 at a position located above the control volume 30. In the current embodiment, the valve housing 26 is mated to an external bore and an O-ring seal 33 separates the supply pressure region that is external to the valve housing 26 from the control volume 30. A second O-ring seal 35 separates the supply pressure region that is external to the valve housing 26 from the ambient or sump pressure region. It will be readily appreciated that the other fittings could be used for securing the valve body in the manifold. Alternatively, the valve body can be made as part of the manifold.

A valve shaft 34 is slidably disposed through the solenoid portion 24b and extends longitudinally into the hydraulic portion 24a. The valve shaft 34 has a hollow channel 36 extending through the longitudinal axis of the valve shaft 34. The hollow channel 36 allows the passage of fluid medium from the hydraulic portion 24a to the solenoid portion 24b. Additionally, the hollow channel 36 may serve the purpose of damping the movement of the valve shaft 34, thus improving the stability of the solenoid valve 10.

The hollow channel 36 has a first end that terminates at a primary valve 38 located within the solenoid portion 24b. The primary valve 38 is formed of a primary poppet 40 that is formed about the end of the valve shaft 34, and a primary valve seat 42 that is formed in the end cap 20. Together the primary poppet 40 and the primary valve seat 42 form the primary valve 38 which is opened and closed by the sliding of the valve shaft 34 along its longitudinal axis.

The hollow channel 36 has a second end that terminates at a secondary valve 44 located in the hydraulic portion 24a. The secondary valve 44 is formed of a secondary poppet 46 which is the end of the valve shaft 34. The secondary poppet 46 is configured to slidably seat against a secondary valve seat 48 which has an aperture 50 that extends through the secondary valve seat 48 to the control volume 30. Together the secondary poppet 46 and the secondary valve seat 48 form the secondary valve 44 which is controlled by the movement of the valve shaft 34.

Figure 1A:
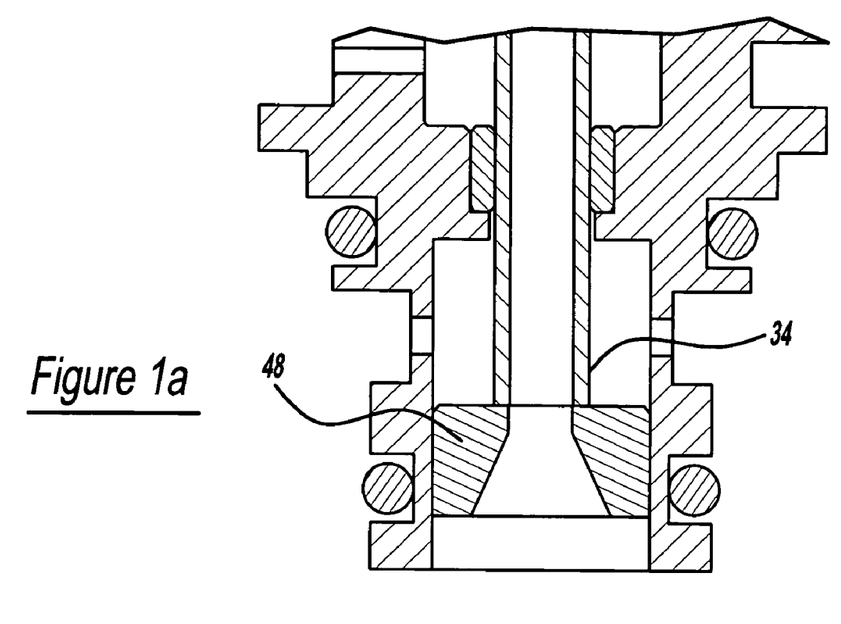
FIG. 1a depicts a broken away cross-sectional plan view of a first alternate embodiment of the secondary valve shown in FIG. 1.
Figure 1B:
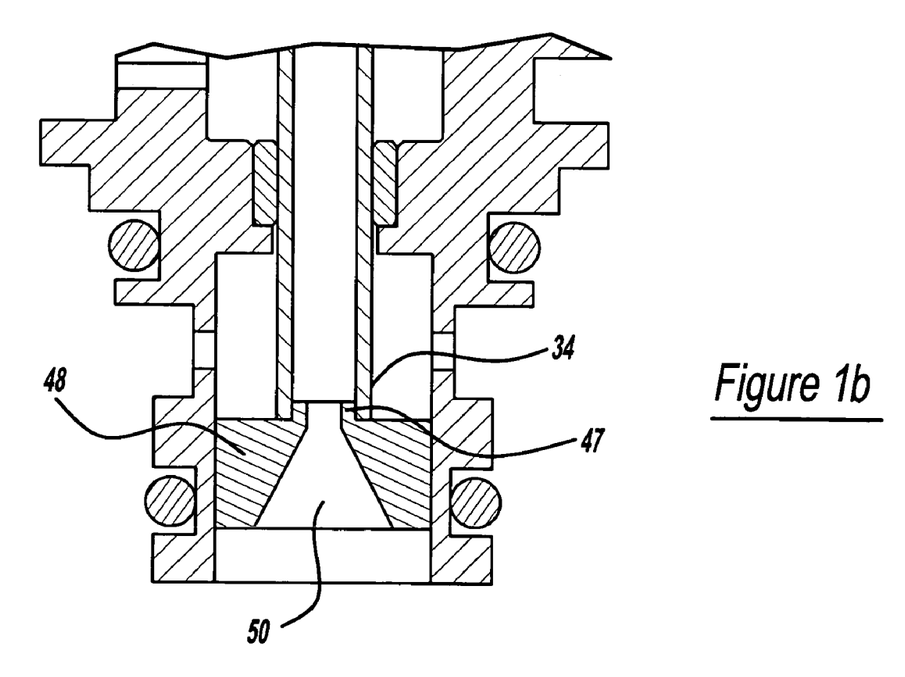
FIG. 1b is a broken away cross-sectional plan view of a second alternate embodiment of the secondary valve shown in FIG. 1.
Figure 1C:
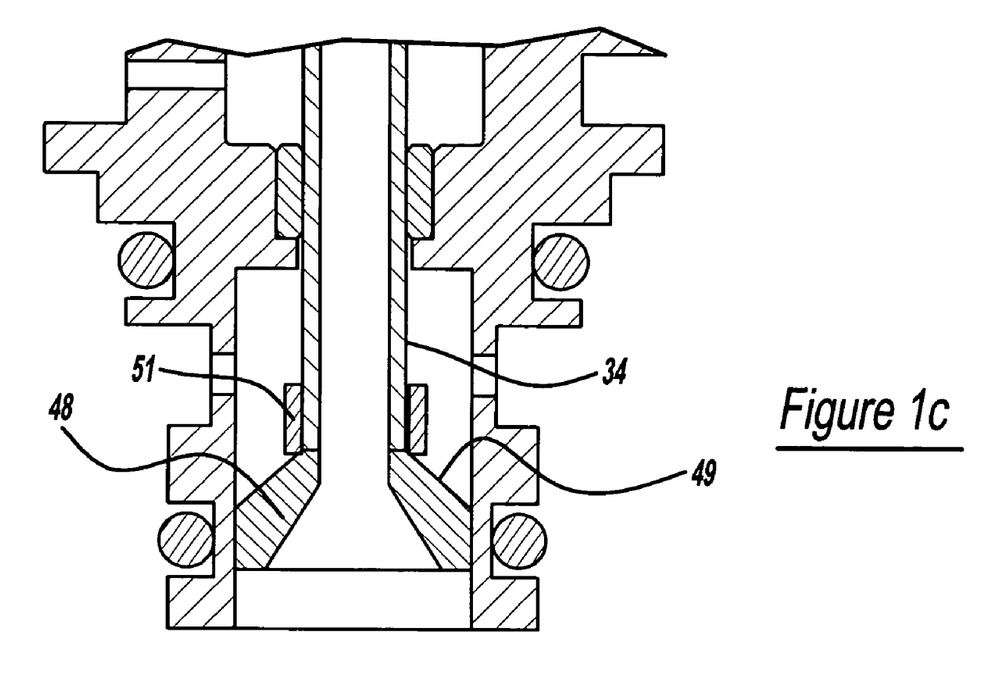
FIG. 1c is a broken away cross-sectional plan view of a third alternate embodiment of the secondary valve shown in FIG. 1.

FIGS. 1a, 1b and 1c depict alternate embodiments of the secondary valve 44. In FIG. 1a the secondary valve 44 does not include the secondary poppet 46. Instead the end of the valve shaft 34 will contact and abut against the secondary valve seat 48 to close the secondary the valve 44.

FIG. 1b depicts another alternate embodiment of the secondary valve 44 wherein the secondary valve seat 48 has a raised nozzle 47. The valve shaft 34 is aligned with the raised nozzle 47 so that the end of the valve shaft 34 slides over and circumscribes the raised nozzle 47. This configuration is useful in applications that require a tighter seal to prevent unwanted leaking of the secondary valve 44.

FIG. 1c depicts an alternate embodiment of the secondary valve 44, wherein the secondary valve seat 48 has a tapered surface 49. The end of the valve shaft 34 has a ring 51 that circumscribes and forms a flanged overhang of the end of the valve shaft 34. The ring 51 contacts the tapered surface 49 of the secondary valve seat 48. The ring 51 functions to provide a tighter seal to prevent unwanted leakage of the secondary valve 44.

It is also within the scope of this invention to incorporate the alternate embodiments shown in FIGS. 1a, 1b and 1c with the primary valve 38 located in the solenoid portion 24b. The primary valve 38 can be configured so that there is no primary poppet 40 and the end of the valve shaft 34 will close the primary valve 38 by abutting against the primary valve seat 42. This would be analogous to the embodiment shown in FIG. 1a.

It is also within the scope of this invention to configure the primary valve 38 so that the primary valve seat 42 has a raised nozzle and the end of the valve shaft 34 configures to slide over and circumscribe the raised nozzle in a manner similar to the alternate embodiment of the secondary valve 44 shown in FIG. 1b.

Lastly it is within the scope of this invention to configure the primary valve 38 so that the primary valve seat 42 has a tapered surface with the end of the valve shaft 34 having a ring that circumscribes and forms a flanged overhand on the end of the valve shaft 34. The ring will contact the tapered surface of the primary valve seat 42 to form a tight seal. This embodiment of the primary valve 38 will operate in a manner similar to the ring 51 in tapered surface 49 shown in FIG. 1c.

In operation the dual poppet low leak valve 10 functions in response to the energization of the solenoid portion 12. When the coil 18 is energized, the valve shaft 34 will slide in a first direction along its longitudinal axis. In order to facilitate the movement of the valve shaft 34, an armature 52 is annularly disposed about and affixed, such as being press fit, or could also be glued, soldered or welded to the valve shaft 34. The armature 52 is affected by the magnetic flux generated as a result of the energization of the coil 18. This causes a linear movement of the valve shaft 34 that is proportional to the degree of current flowing through the coil 18 in the solenoid portion 12. When the solenoid portion 12 is energized, the valve shaft 34 will slide in a first direction toward the end cap 20 so that the primary poppet 40 will seat against the primary valve seat 42, thus closing off the primary valve 38. Simultaneously, the secondary valve 44 will be opened as the movement of the valve shaft 34 will cause the secondary poppet 46 to move away from the secondary valve seat 48.

In the present embodiment of the invention, when the coil 18 of the solenoid portion 12 is de-energized a spring 60 will cause the armature 52 to slide in a second direction opposite the movement of the armature 52 when it is energized. The spring 60 in the present embodiment of the invention is disposed between the armature 52 and the upper bearing 64. When the solenoid portion 12 is de-energized, the spring 60 will exert force against the armature 52 to cause the valve shaft 34 to move in the opposite direction so that the secondary valve 44 is closed as the secondary poppet 46 contacts the secondary valve seat 48. Simultaneously, the primary valve 38 will move to the fully opened position as the primary poppet 40 moves away from the primary valve seat 42. In order to ease the movement of the valve shaft 34, a lower bearing 62 is positioned between the wall of the valve housing 26 and the valve shaft 34, and an upper bearing 64 is positioned between the valve shaft 34 and the pole piece 54, thus allowing the valve shaft 34 to more freely slide along its longitudinal axis.

In order to achieve the desired proportional magnetic flux, a pole piece 54 is disposed in the solenoid portion 12 located adjacent to a portion of the bobbin 16. In this particular embodiment, the pole piece 54 has a reduced inner diameter flange 56 which is configured to overlap the armature 52 when the solenoid portion 12 is energized. The overlapping flange 56 causes the desired proportional magnetic flux to be achieved because the geometry of the flanges 56, affects the distribution of the magnetic field generated by the energized coil 18.

Figure 2:
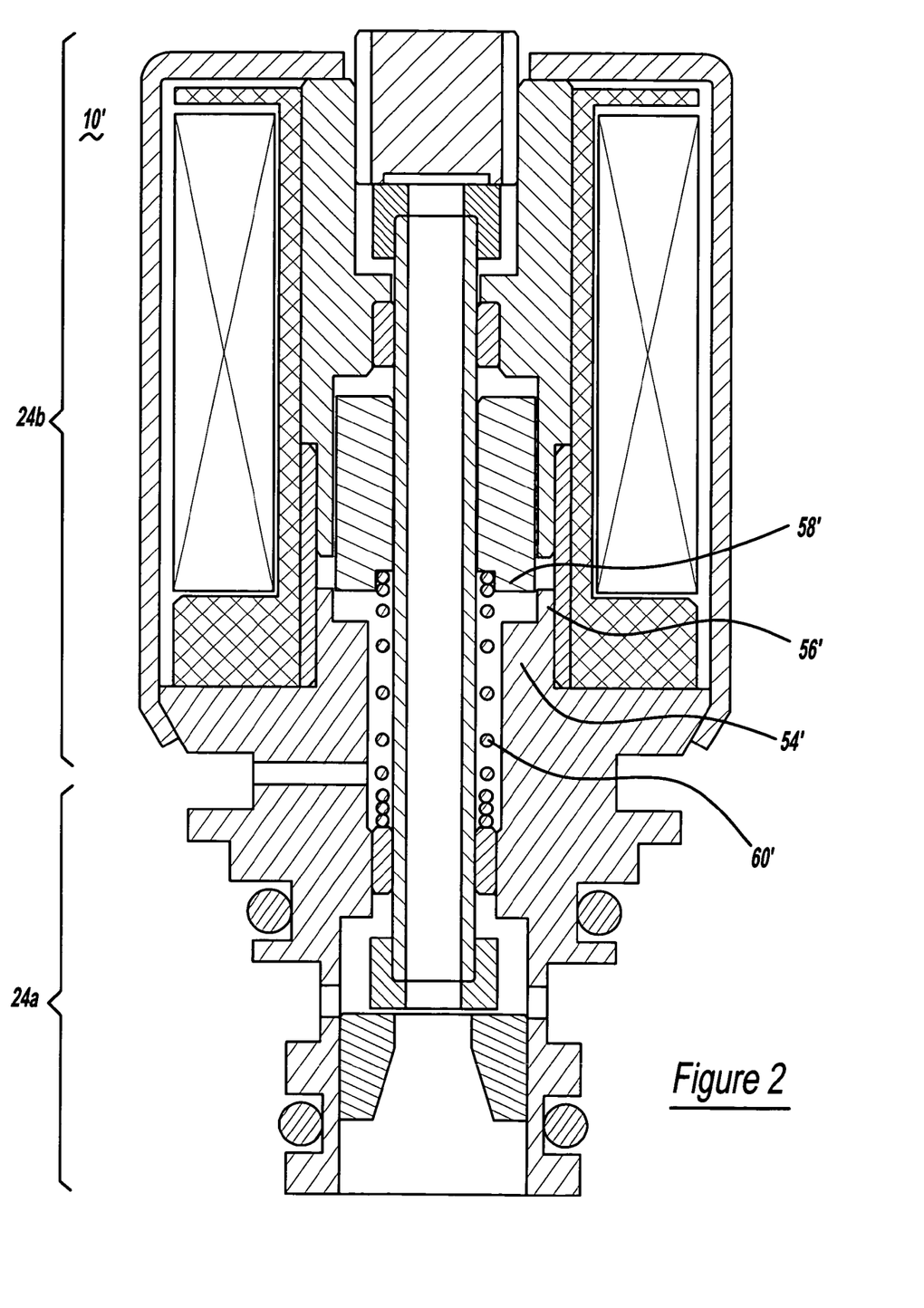
FIG. 2 depicts a cross-sectional plan view of a second embodiment of the dual poppet low leak valve configuration.

FIG. 2 depicts a cross-sectional plan view of an alternate embodiment of the dual poppet low leak valve configuration. The alternate embodiment shown in FIG. 2 differs from the embodiment shown in FIG. 1 with respect to the positioning of the pole piece, flux tube, spring and armature. FIG. 2 shows a pole piece 54' that is part of the hydraulic portion 24. The pole piece 54' has an increased diameter inner portion 56' that is configured to overlap for shaping magnetic characteristics the armature 52. A spring 60' is disposed between the armature 52 and the lower bearing 62. In this particular embodiment of the invention, when the solenoid portion 12 is energized the armature 52 will move in a first direction to close the secondary valve 44 by causing the secondary poppet 46 to come into contact with the secondary valve seat 48. Simultaneously, the primary valve 38 will be opened as the primary poppet 40 moves away from the primary valve seat 42. When the solenoid portion 12 is de-energized, the spring 60' will exert force against the armature 52 and cause the valve shaft 34 to slide in a second direction so that the primary valve 38 becomes closed as the primary poppet 40 comes into contact with the primary valve seat 42. Simultaneously, the secondary valve 44 will be opened as the secondary poppet 46 moves away from the secondary valve seat 48. This is what is referred to as a normally closed valve since the primary valve 38 is in the closed position when the solenoid portion 24b is de-energized. The operation of the dual poppet low leak valve 10' in this particular embodiment is similar to the embodiment depicted in FIG. 1 with the exception that when the solenoid portion 12 is energized, the primary valve 38 will be opened and the secondary valve 44 will be closed, whereas, in FIG. 1 when the valve 10 becomes energized the primary valve 38 will be closed, while the secondary valve 44 will be opened.

Figure 3:
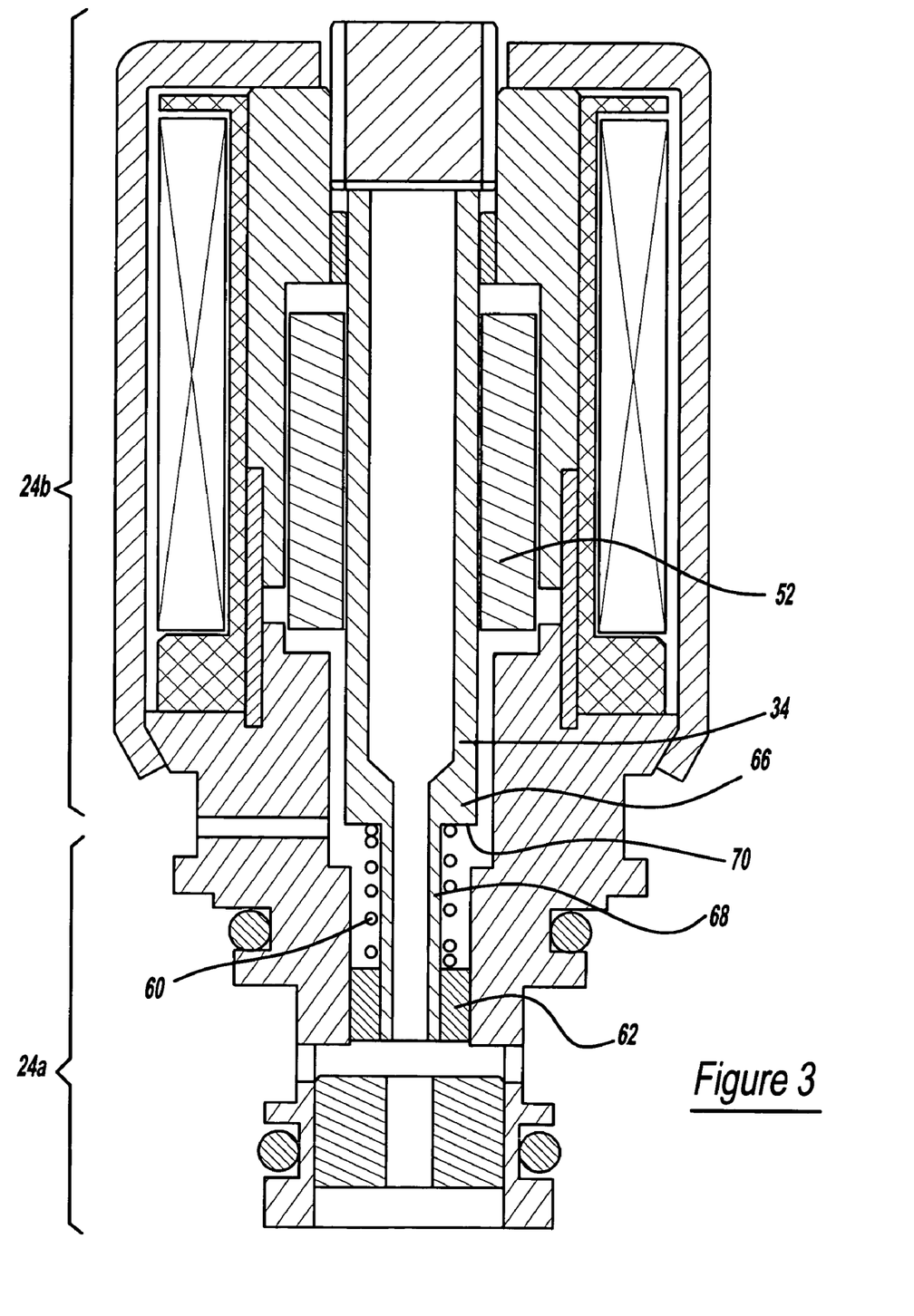
FIG. 3 is a cross-sectional plan view of a third embodiment of the invention having a tapered valve shaft.

FIG. 3 depicts an alternate embodiment of FIG. 2. This particular embodiment has a valve shaft 34 that has a large diameter portion 66 and a smaller diameter portion 68. The spring 60 will extend between the lower bearing 62 and a shoulder 70. In this embodiment the spring 60 does not extend into the solenoid portion 24b, and it acts directly upon the valve shaft 34 instead of the armature 52. Like the valve depicted in FIG. 2, the valve in this embodiment is also configured so the primary valve 38 is in the closed position when the solenoid portion 24b is de-energized (i.e., a normally closed valve).

Figure 4:
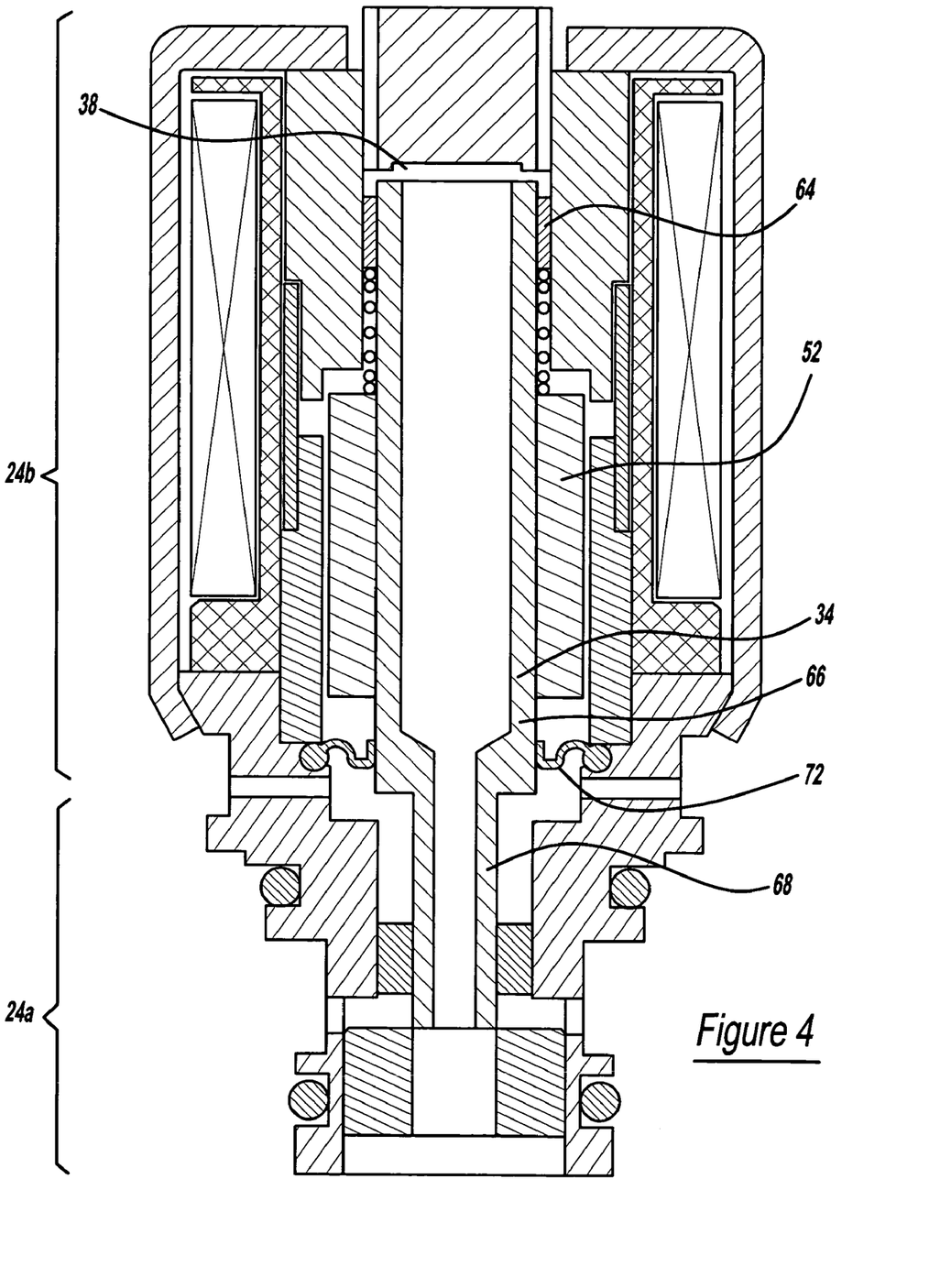
FIG. 4 is a cross-sectional plan view of another embodiment of the invention having a diaphragm for sealing the hydraulic portion from the motorized portion.

FIG. 4 depicts an alternate embodiment of FIG. 1. This particular embodiment has a valve shaft 34 that has a large diameter portion 66 and a small diameter portion 68. The spring 60 will extend between the upper bearing 64 and armature 52. Additionally, this embodiment has a diaphragm 72 which functions to seal the solenoid portion 24b from the hydraulic valve portion 24a. Like the valve depicted in FIG. 1, the valve depicted in this particular embodiment is what is referred to as a normally open valve since the primary valve 38 is in the open position when the solenoid portion 24b is de-energized.

The method of operating the valve described permits a same pressure regulation function while reducing the amount of hydraulic fluid exhaust leakage to the sump as compared to a conventional variable bleed solenoid. This is accomplished by an integrated supply shut off (secondary) valve 44 that is actuated in conjunction with the exhaust bleed (primary) valve 38. At low pressure, the secondary valve 44 blocks supply pressure from the supply port 32 from entering the control volume 30. As the solenoid 12 is actuated, the secondary valve 44 is opened as the secondary poppet 46 is moved away from the secondary valve seat 48, allowing supply pressure into the control volume 30 and the primary valve 38 moves toward the closed position as the primary poppet 40 moves toward the primary valve seat 42 thereby, incrementally reducing exhaust leakage and increasing pressure in the control volume 30 at the stroke limit of the solenoid 12. As the primary poppet 40 approaches the primary valve seat 42 surface, the secondary valve 44 is opened to its fullest extent. At this point the pressure in the control volume 30 is at its peak, and the exhaust leakage is minimized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure control valve comprising:

a housing;

a supply port at a first end of said housing;

a control port at a first end of said housing;

an exhaust port at a second end of said housing;

a primary poppet and a primary seat, which provide control pressure feedback acting to open said primary poppet, wherein said primary poppet has a larger diameter and is operably associated with said exhaust port;

a secondary poppet and a secondary seat operably associated with said supply port and said control port, wherein said secondary poppet has a smaller diameter which partially offsets the control feedback pressure of said primary poppet;

a hollow valve shaft including both poppets, slidably disposed between said primary seat and said secondary seat, wherein said hollow valve shaft allows flow and pressure communication between said primary poppet and said secondary poppet and provides viscous dampening of said valve;

a solenoid actuator having an armature fixed to said valve shaft allowing for the positioning of said valve shaft between said primary seat and said secondary seat to achieve variable pressure control proportional to the current applied to said actuator to regulate pressure to said control port;

a lower bearing supporting said valve shaft having an inner diameter sized approximately the same as the secondary poppet diameter and located at the supply port such that said bearing acts as a pressure boundary minimizing the area of the movable valve shaft on which supply port pressure acts; and an upper bearing located adjacent to the larger primary poppet supporting said valve shaft and minimizing the transfer of ferrous contamination for controlled fluid to working air gaps of said actuator.

2. The valve of claim 1 further comprising an adjustable end cap disposed through said housing of said solenoid, wherein said exhaust port is disposed about said end cap.

3. The solenoid valve of claim 1 further comprising a spring configured about said hollow valve shaft, wherein said spring is biased to move said secondary poppet in a direction to contact said secondary valve seat placing said dual poppet low leak solenoid valve in a normally open or normally low pressure position.

4. The solenoid valve of claim 1 further comprising a spring configured about said hollow valve shaft, wherein said spring is biased to move said primary poppet in a direction to contact said primary valve seat, placing said valve in a normally closed or normally high pressure position.

* * * * *